(12) United States Patent
Chiou et al.

(10) Patent No.: US 12,339,803 B2
(45) Date of Patent: Jun. 24, 2025

(54) HUB TRANSMISSION DIRECTION CONTROL METHOD, HUB AND CONTROL CIRCUIT

(71) Applicant: ANPEC ELECTRONICS CORPORATION, Hsinchu (TW)

(72) Inventors: Ruei-Hung Chiou, Hsinchu (TW); Yun-Li Liu, Hsinchu (TW); Che-Chang Chang, Hsinchu County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 51 days.

(21) Appl. No.: 18/427,723

(22) Filed: Jan. 30, 2024

(65) Prior Publication Data

US 2025/0173306 A1 May 29, 2025

(30) Foreign Application Priority Data

Nov. 24, 2023 (TW) ................................ 112145455

(51) Int. Cl.
*G06F 13/42* (2006.01)
*G06F 13/40* (2006.01)

(52) U.S. Cl.
CPC ...... *G06F 13/4291* (2013.01); *G06F 13/4022* (2013.01)

(58) Field of Classification Search
CPC .......................... G06F 13/4291; G06F 13/4022
See application file for complete search history.

(56) References Cited

U.S. PATENT DOCUMENTS

| | | | | |
|---|---|---|---|---|
| 5,784,581 A | * | 7/1998 | Hannah ............... | G06F 13/4291 710/110 |
| 6,862,653 B1 | * | 3/2005 | Dodd .................. | G06F 13/1673 710/310 |
| 2013/0166813 A1 | * | 6/2013 | Chandra ............... | H04L 49/602 710/316 |
| 2019/0171590 A1 | * | 6/2019 | Mishra .............. | H04L 12/40045 |
| 2019/0171595 A1 | | 6/2019 | Mishra et al. | |
| 2019/0347239 A1 | * | 11/2019 | Mishra ................ | G06F 13/4291 |

FOREIGN PATENT DOCUMENTS

TW 201926064 A 7/2019

* cited by examiner

*Primary Examiner* — Phong H Dang
(74) *Attorney, Agent, or Firm* — Li & Cai Intellectual Property Office

(57) ABSTRACT

A hub transmission direction control method, a hub and a control circuit are provided. The method includes processes of: detecting a clock signal of a host serial clock line; starting timing when the clock signal meets a trigger condition; when the timed time reaches a preset time, detecting a host data signal of a host data line communicated with a host device and a local data signal of a local data line communicated with a local device; and setting, according to a detection result of the host data signal and the local data signal, a first transmission direction in which data is transmitted from the host data line to the local data line, or a second transmission direction in which data is transmitted from the local data line to the host data line, as a transmission direction between the host data line and the local data line.

12 Claims, 7 Drawing Sheets

HUB TRANSMISSION DIRECTION CONTROL METHOD, HUB AND CONTROL CIRCUIT

CROSS-REFERENCE TO RELATED PATENT APPLICATION

This application claims the benefit of priority to Taiwan Patent Application No. 112145455, filed on Nov. 24, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a hub transmission direction control method, and more particularly to a hub transmission direction control method, a hub and a control circuit.

BACKGROUND OF THE DISCLOSURE

Among serial transmission specifications, an inter-integrated circuit (I2C) bus standard technology is widely used. The I2C bus standard technology is further improved to form an improved inter-integrated circuit (I3C) bus standard technology. The I3C bus standard technology has higher communication speed and lower power consumption than the I2C bus standard technology. Therefore, in various applications related to sensors having low-power-consumption, the I3C bus standard technology has gained significance and become widely used in different situations.

A host data line (HSDA) and a local data line (LSDA) are required for data transmission of a hub matched with an I3C bus transmission protocol. When a serial clock (SCL) signal is at a low level and a working frequency of the hub is a default frequency, a transmission direction of data is determined according to the form of the data on the host data line (HSDA) and the local data line (LSDA). However, this can cause the transmission direction of the data to be wrongly determined due to unsynchronized timing.

SUMMARY OF THE DISCLOSURE

In response to the above-referenced technical inadequacies, the present disclosure provides a hub transmission direction control method. The hub transmission direction control method includes processes of: detecting a clock signal of a host serial clock line; when the clock signal meets a trigger condition, starting timing; when timed time reaches a preset time, detecting a host data signal of a host data line communicated with a host device and detecting a local data signal of a local data line communicated with a local device; and setting, according to a detection result of the host data signal and the local data signal, a first transmission direction in which the data is transmitted from the host data line to the local data line, or a second transmission direction in which the data is transmitted from the local data line to the host data line, as a transmission direction between the host data line and the local data line.

In order to solve the above-mentioned problems, one of the technical aspects adopted by the present disclosure is to provide a hub. The hub includes a host transmission interface, a local transmission interface, a control circuit and a switching circuit. The host transmission interface has a host series clock line and a host data line. The local transmission interface has a local series clock line and a local data line. The switching circuit is connected respectively to the host transmission interface and the local transmission interface. The control circuit detects a clock signal of the host serial clock line. When the clock signal meets a trigger condition, the control circuit starts timing. When timed time reaches a preset time, the control circuit detects a host data signal of the host data line communicated with a host device and detects a local data signal of the local data line communicated with a local device. The control circuit, according to a detection result of the host data signal and the local data signal, sets a first transmission direction in which the data is transmitted from the host data line to the local data line, or a second transmission direction in which the data is transmitted from the local data line to the host data line, as a transmission direction between the host data line and the local data line.

In order to solve the above-mentioned problems, one of the technical aspects adopted by the present disclosure is to provide a control circuit. The control circuit includes a controller and a storage. The storage is configured to store one or more programs. The one or more programs are executed on the controller for performing the hub transmission direction control method.

As described above, the present disclosure provides the hub transmission direction control method, the hub and the control circuit. In the hub transmission direction control method of the present disclosure, the delay detection operation is performed such that the transmission direction is determined within the preset time elapsed after the current time reaches the time point of the falling edge of the clock signal. Under this condition, the transmission direction is prevented from being affected due to unsynchronized timing. Therefore, the transmission direction is accurately determined without increasing a sampling frequency of an internal operating clock signal and disposing additionally an interrupt pin.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
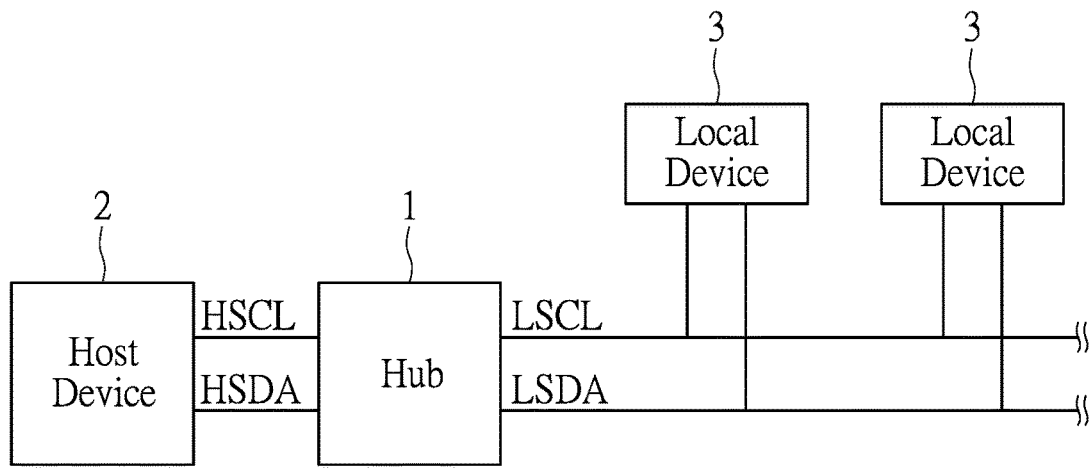
FIG. 1 is a schematic diagram of an architecture of a system including a hub according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a hub transmission direction control method, a hub and a control circuit. The hub is connected between the host device and the one or more local devices through a two-line serial transmission bus. Bidirectional data transmission between the host device and the one or more local devices is realized through the hub and the two-line serial transmission bus. However, data is only transmitted from the host device to the local device or is only transmitted from the local device to the host device at the same time point. The hub performs a delay detection operation to accurately determine a data transmission request of the host device or the local device and accordingly controls the transmission direction of the data. As a result, the transmission direction of the data is prevented from being wrongly determined due to unsynchronized timing.

First Embodiment

Reference is made to FIG. 1, which is a schematic diagram of an architecture of a system including a hub according to a first embodiment of the present disclosure.

In the first embodiment, a hub 1 is connected to a host device 2 through two lines such as a clock line and a data line. The hub 1 is connected to a local device 3 through two lines such as a clock line and a data line. As shown in FIG. 1, the hub 1 is connected to the host device 2 through a host serial clock line HSCL and a host data line HSDA. As shown in FIG. 1, the hub 1 is connected to the local device 3 through a local serial clock line LSCL and a local data line LSDA.

The hub 1 receives a clock signal through the host serial clock line HSCL, and outputs the clock signal to the local device 3 through the local serial clock line LSCL.

When the host device 2 transmits data toward the local device 3, the hub 1 receives data from the host device 2 through the host data line HSDA and then transmits the data to the local device 3 through the local data line LSDA. That is, the data is transmitted from the host data line HSDA to the local data line LSDA.

When the local device 3 transmits data toward the host device 2, the hub 1 receives data from the local device 3 through the local data line LSDA and then transmits the data to the host device 2 through the local data line LSDA. That is, the data is transmitted from the local data line LSDA to the host data line HSDA.

It is worth noting that, the hub 1 performs the delay detection operation on determining of the transmission direction of the data. In the latency detection operation, a time interval is defined by using detection windows, whether timed time reaches a preset time is determined within the defined time interval. When the timed time reaches the preset time, the transmission direction of data is determined as described in detail in the following.

In addition, it is worth noting that, in the first embodiment, the two-line serial transmission bus used on the hub 1 is an improved inter integrated circuit (I3C) bus. The hub 1 detects form of a host data signal of the host data line HSDA and a local data signal of the local data line LSDA to determine the transmission direction of the data, as exemplified as follow.

When the host data signal of the host data line HSDA is at a low logic level (that is "0") and the local data signal of the local data line LSDA is at a low logic level (that is "0"), the transmission direction is the first transmission direction. In the first transmission direction, the data is transmitted from the host data line HSDA of the host device 2 to the local data line LSDA of the local device 3.

When the host data signal of the host data line HSDA is at the low logic level (that is "0") and the local data signal of the local data line LSDA is at a high logic level (that is "1"), the transmission direction is the first transmission direction. In the first transmission direction, the data is transmitted from the host data line HSDA of the host device 2 to the local data line LSDA of the local device 3.

When the host data signal of the host data line HSDA is at the high logic level (that is "1") and the local data signal of the local data line LSDA is at the high logic level (that is "1"), the transmission direction is the first transmission direction. In the first transmission direction, the data is transmitted from the host data line HSDA of the host device 2 to the local data line LSDA of the local device 3.

When the host data signal of the host data line HSDA is at the high logic level (that is "1") and the local data signal of the local data line LSDA is at the low logic level (that is "0"), the transmission direction is the second transmission direction. In the second transmission direction, the data is transmitted from the local data line LSDA of the local device 3 to the host data line HSDA of the host device 2.

The above-mentioned descriptions are listed in a following first table:

| [Second Embodiment] | | |
|---|---|---|
| | LSDA = 0 | LSDA = 1 |
| HSDA = 0 | HSDA to LSDA | HSDA to LSDA |
| HSDA = 1 | LSDA to HSDA | HSDA to LSDA |

Figure 2:
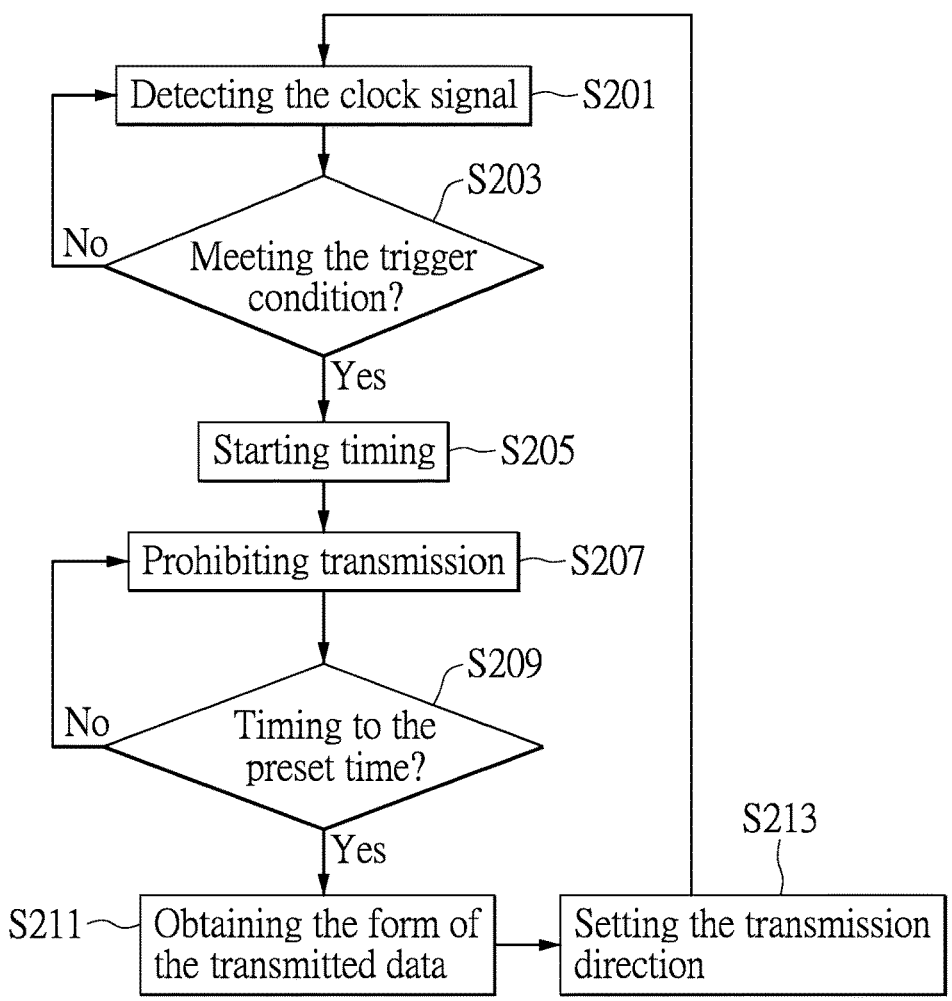
FIG. 2 is a flowchart diagram of a hub transmission direction control method according to a second embodiment of the present disclosure.

Reference is made to FIG. 2, which is a flowchart diagram of a hub transmission direction control method according to a second embodiment of the present disclosure.

The hub transmission direction control method of the present disclosure includes a plurality of processes S201 to S213 as shown in FIG. 2, but the present disclosure is not limited thereto. The processes S201 to S213 as shown in FIG. 2 may be performed on the architecture as shown in FIG. 1.

In step S201, the clock signal is detected. A change in the clock signal of the host serial clock line HSCL (or the local serial clock line LSCL) is detected by the hub 1.

In step S203, whether or not the clock signal meets a trigger condition is determined. For example, a condition that a current time reaches a time point of a falling edge of the clock signal is defined as the trigger condition. A transition of the clock signal is detected in step S201 for determining whether or not the current time reaches the time point of the falling edge of the clock signal in step S203.

In step S205, timing is started. When the clock signal meets the trigger condition, the hub 1 instantly starts timing for the preset time from the time point of the falling edge of the clock signal.

In step S207, transmission is prohibited. When the hub 1 starts timing, data transmission between the host device 2 and the local device 3 is prohibited by the hub 1. For example, an open circuit is formed between the host data line HSDA and the local data line LSDA for prohibiting the data from being transmitted between the host device 2 and the local device 3.

In step S209, whether or not the timed time reaches the preset time is determined. The hub 1 continually determines whether or not the timed time reaches the preset time.

In step S211, form of the host data signal and form of the local data signal are determined. When the timed time reaches the preset time, the hub 1 determines the form of the host data signal such as the logic level of the host data signal of the host data line HSDA and the form of the local data such as the logic level of the local data signal of the local data line LSDA.

In step S213, the transmission direction is set. The hub 1, according to the form of the host data signal and form of the local data signal that are determined in step S211, looks up the first table to obtain the first transmission direction or the second transmission direction as the transmission direction of the data. In the first transmission direction, the data is transmitted from the host data line HSDA to the local data line LSDA. In the second transmission direction, the data is transmitted from the local data line LSDA to the host data line HSDA. Then, the hub 1 sets the data to be transmitted between the host data line HSDA and the local data line LSDA in the looked-up transmission direction. That is, the transmission of the data on the host data line HSDA and the local data line LSDA is resumed in the looked-up transmission direction.

When the clock signal meets the trigger condition in step S203, the hub 1 starts timing for the preset time. Whether the timed time reaches the preset time is determined within the time interval defined by using the detection windows. When the timed time reaches the preset time, the transmission direction of data is determined. For example, the hub 1 starts determining the transmission direction within the preset time elapsed after the current time reaches the time point of the falling edge of the clock signal.

The preset time may be shorter than time during which the clock signal at a low level, and the hub 1 determines the transmission direction only once within the time during which the clock signal at the low level. As a result, the hub 1 only changes the transmission direction once within the time during which the clock signal at the low level.

A time difference between a time point at which the timed time reaches the preset time and a time point of a rising edge of the clock signal may be larger than a data setup time. The time point of the rising edge of the clock signal is later than the time point at which the timed time reaches the preset time.

Figure 3:
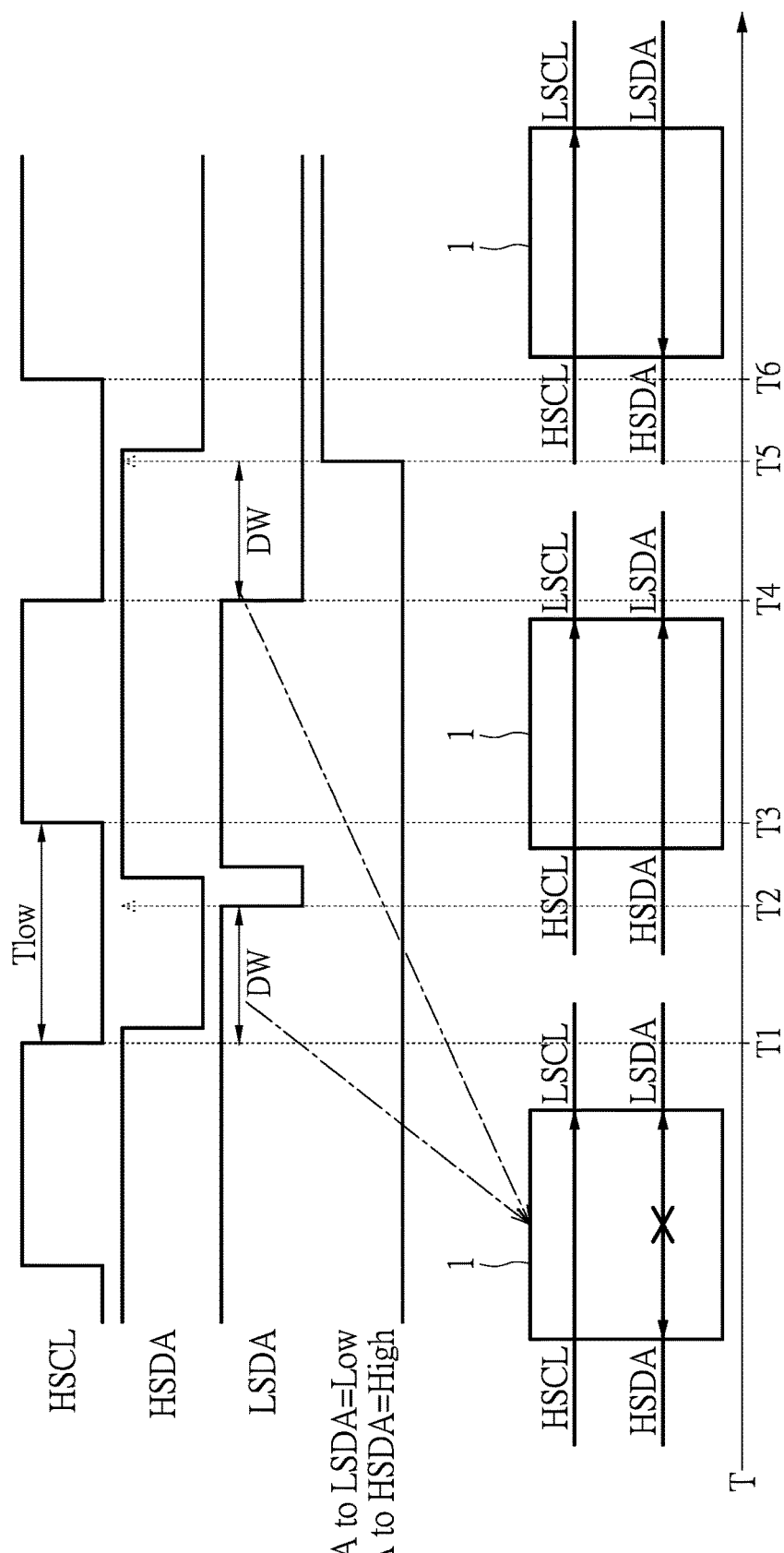
FIG. 3 is a first schematic diagram of the hub transmitting signals according to the second embodiment of the present disclosure.

Reference is made to FIG. 3, which is a first schematic diagram of the hub transmitting signals according to the second embodiment of the present disclosure. A time point T1 and a time point T4 as shown in FIG. 3 are time points of the falling edges of the clock signal and are used as trigger time points.

The hub 1 starts timing for the preset time from the time point T1 to the time point T2. At the time point T2, the hub 1 starts determining the transmission direction of the data. At the time point T2, the logic level of the host data signal of the host data line HSDA is the low logic level (that is "0"), and the logic level of the local data signal of the local data line LSDA is the high logic level (that is "1"). Accordingly, the hub 1 determines that the transmission direction of the data is the first transmission direction. In the first transmission direction, the data is transmitted from the host device 2 through the hub 1 to the local device 3.

The hub 1 starts timing for the preset time from the time point T4 to a time point T5. At the time point T5, the hub 1 starts determining that the transmission direction of the data. At the time point T5, the logic level of the host data signal of the host data line HSDA is the high logic level (that is "1"), and the logic level of the local data signal of the local data line LSDA is the high logic level (that is "1"). Accordingly, the hub 1 determines that the transmission direction of the data is the second transmission direction. In the second transmission direction, the data is transmitted from the local device 3 through the hub 1 to the host device 2.

As shown in FIG. 3, the open circuit is formed between the host data line HSDA and the local data line LSDA of the hub 1 for prohibiting the data from being transmitted between the host device 2 and the local device 3 through the hub 1 within a time interval between the time point T1 and the time point T2 and a time interval between the time point T4 and the time point T5.

The hub 1 allows the data is transmitted in the first transmission direction within the time interval between the time point T2 and the time point T4 as shown in FIG. 3. In the first transmission direction, the data is transmitted from the host data line HSDA of the host device 2 through the hub 1 to the local data line LSDA of the local device 3.

The hub 1 allows the data is transmitted in the second transmission direction after the time point T5 ends. In the second transmission direction, the data is transmitted from the local data line LSDA of the local device 3 through the hub 1 to the host data line HSDA of the host device 2.

A time length of the time interval between the time point T4 and the time point T5 is equal to a time length of the time interval between the time point T2 and the time point T4. The time interval between the time point T4 and the time point T5 and the time interval between the time point T2 and the time point T4 are defined as the detection windows DW herein. The time length of the detection window DW (that is the time interval between the time point T4 and the time point T5 or the time interval between the time point T2 and the time point T4) is shorter than a time length of a time interval (between the time point T1 and the time point T3 or between the time point T4 and a time point T6) during which the clock signal at the low level.

As shown in FIG. 3, the hub 1 determines a change in the transmission direction for setting the transmission direction only once within the time during which the clock signal at the low level. The hub 1 prohibits the data from being transmitted between the host device 2 and the local device 3 within the detection windows DW, thereby preventing the transmission direction from being wrongly determined due to unsynchronized timing.

Figure 4:
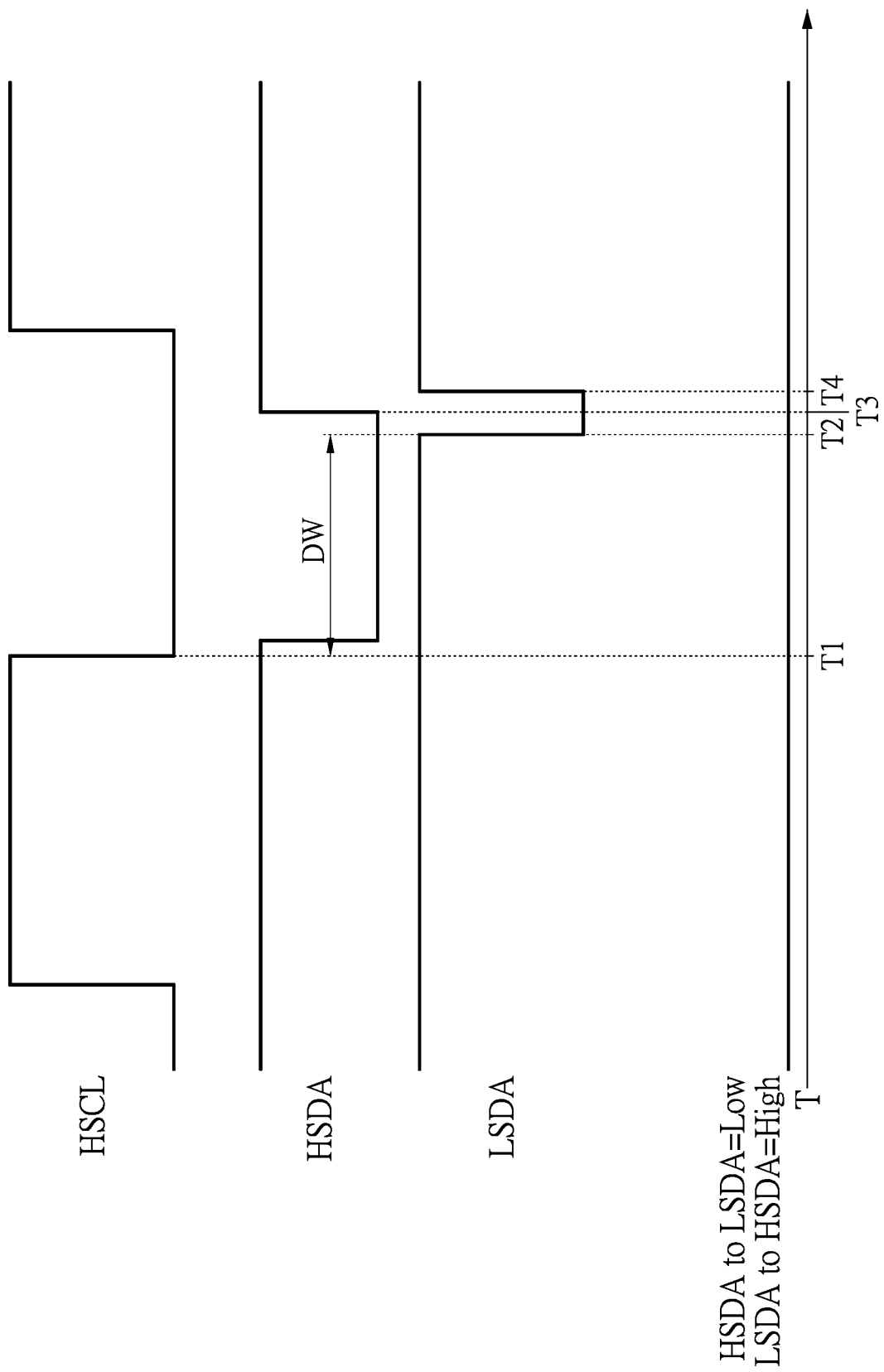
FIG. 4 is a second schematic diagram of the hub transmitting signals according to the second embodiment of the present disclosure.

Reference is made to FIG. 4, which is a second schematic diagram of the hub transmitting signals according to the second embodiment of the present disclosure.

As shown in FIG. 4, one of a plurality of falling edges of the clock signal of the host serial clock line HSCL is generated at the time point T1. Therefore, the time point T1 is used as the trigger time point.

The hub 1 starts timing for the preset time from the time point T1 to the time point T2 as shown in FIG. 4. At the time point T2, the hub 1 sets the first transmission direction as the transmission direction of the data. In the first transmission direction, the data is transmitted from the host device 2 through the hub 1 to the local device 3.

A transition occurs in the host data signal of the host data line HSDA at the time point T3, and a transition occurs in the local data signal of the local data line LSDA at the time point T4. After the hub 1 sets the transmission direction of the data at the time point T2, the hub 1 does not determine the transmission direction of the data at the time points T3 and T4. The hub 1 does not determine the transmission direction of the data until when a next one of the plurality of falling edges of the clock signal of the host serial clock line HSCL as shown in FIG. 4 is generated, thereby preventing the transmission direction from being wrongly determined due to unsynchronized timing.

Figure 5:
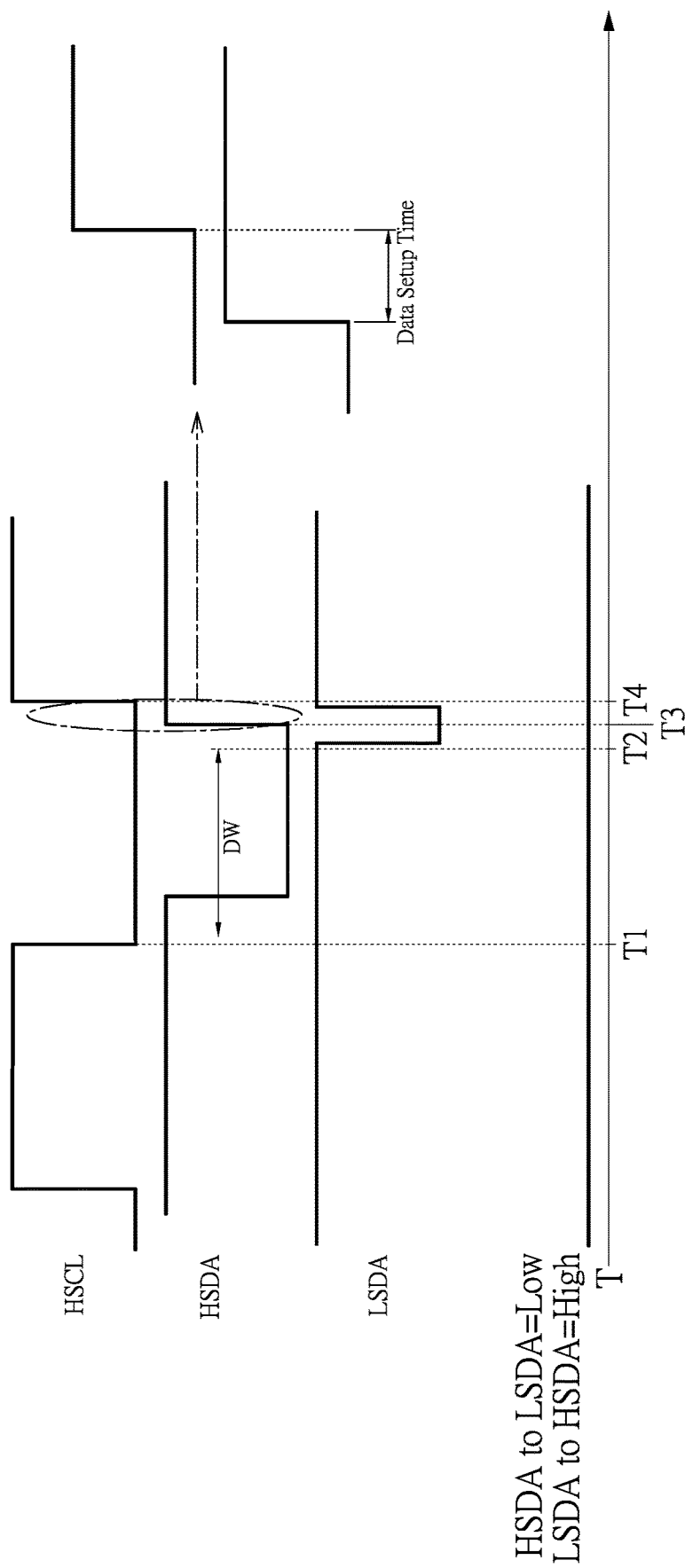
FIG. 5 is a third schematic diagram of the hub transmitting signals according to the second embodiment of the present disclosure.

Reference is made to FIG. 5, which is a third schematic diagram of the hub transmitting signals according to the second embodiment of the present disclosure.

As shown in FIG. 5, one of the plurality of falling edges of the clock signal of the host serial clock line HSCL is generated at the time point T1. Therefore, the time point T1 is used as the trigger time point.

The hub 1 starts timing for the preset time from the time point T1 to the time point T2 as shown in FIG. 5. At the time point T2, the hub 1 sets the first transmission direction as the transmission direction of the data. In the first transmission direction, the data is transmitted from the host device 2 through the hub 1 to the local device 3.

As shown in FIG. 5, a time difference between a time point T3 of a rising edge of the host data signal of the host data line HSDA and a time point T4 of a rising edge of the clock signal of the host serial clock line HSCL is shorter than the data setup time. The hub 1 has set the transmission direction of the data at the time point T2. Therefore, the hub 1 does not determine the transmission direction of the data again until when a next one of the plurality of falling edges of the clock signal of the host serial clock line HSCL as shown in FIG. 5 is generated, thereby preventing the transmission direction from being wrongly determined due to unsynchronized timing.

Figure 6:
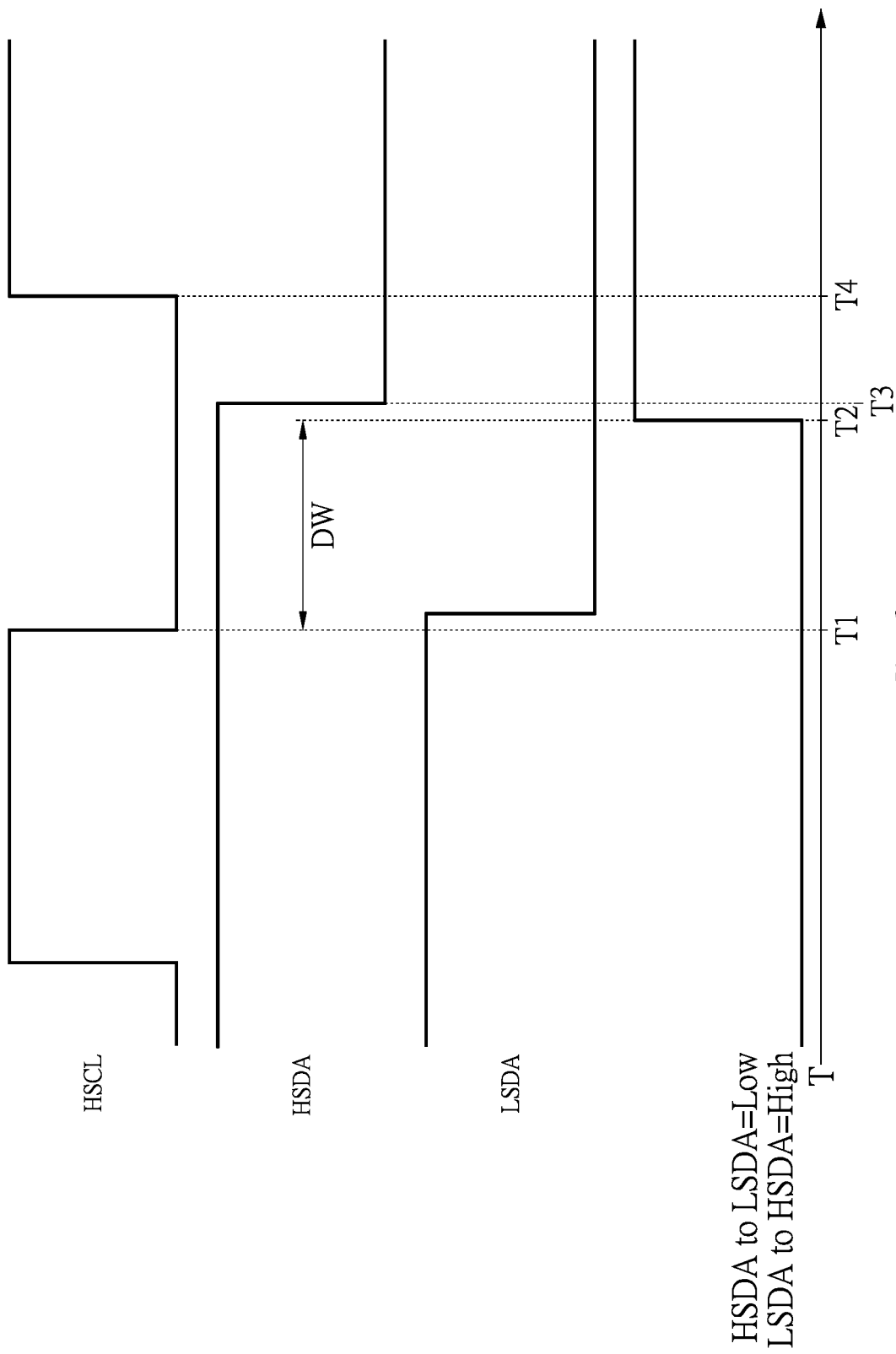
FIG. 6 is a fourth schematic diagram of the hub transmitting signals according to the second embodiment of the present disclosure.

Reference is made to FIG. 6, which is a fourth schematic diagram of the hub transmitting signals according to the second embodiment of the present disclosure.

As shown in FIG. 6, one of the plurality of falling edges of the clock signal of the host serial clock line HSCL is generated at the time point T1. Therefore, the time point T1 is used as the trigger time point.

The hub 1 starts timing for the preset time from the time point T1 to the time point T2 as shown in FIG. 6. At the time point T2, the hub 1 sets the second transmission direction as the transmission direction of data. In the second transmission direction, the data is transmitted from the local device 3 through the hub 1 to the host device 2.

As shown in FIG. 6, a transition occurs in the host data signal of the host data line HSDA at the time point T3. However, the hub 1 has set the transmission direction of the data at the time point T2. The hub 1 does not determine the transmission direction of the data again according to the transition of the host data signal of the host data line HSDA at the time point T3. The hub 1 does not determine the transmission direction of the host data signal again until when a next one of the plurality of falling edges of the clock signal of the host data line HSDA as shown in FIG. 6 is generated, thereby preventing the transmission direction from being wrongly determined due to unsynchronized timing.

Figure 7:
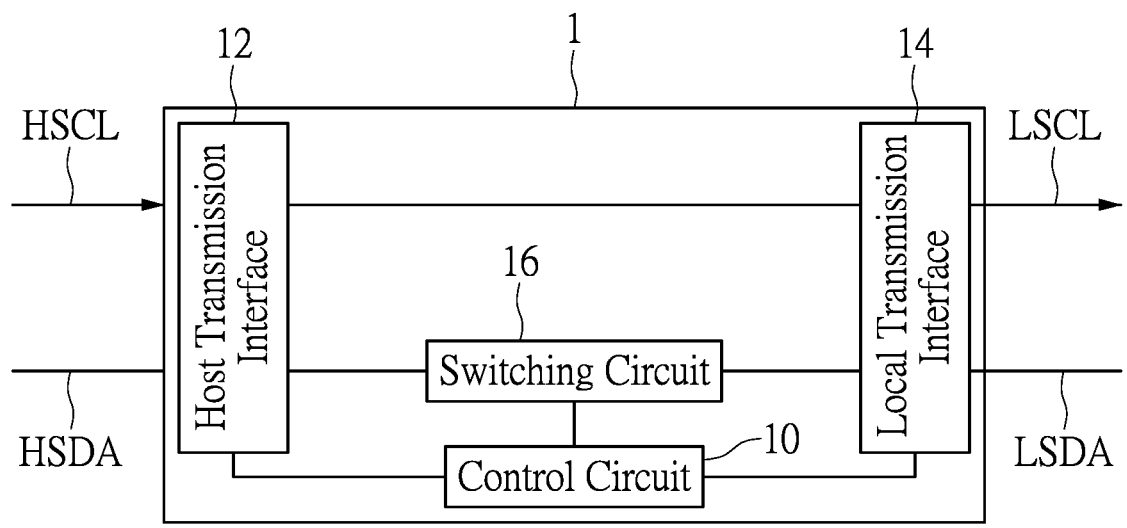
FIG. 7 is a block diagram of the hub according to the second embodiment of the present disclosure.

Reference is made to FIG. 7, which is a block diagram of the hub according to the second embodiment of the present disclosure.

As shown in FIG. 7, the hub 1 may include a control circuit 10, a host transmission interface 12, a local transmission interface 14 and a switching circuit 16, but the preset disclosure is not limited thereto.

The control circuit 10 is connected to the host transmission interface 12, the local transmission interface 14 and the switching circuit 16. The switching circuit 16 is connected to the host transmission interface 12 and the local transmission interface 14.

The host transmission interface 12 may include a two-wire transmission interface composed of the host serial clock line HSCL and the host data line HSDA.

The local transmission interface 14 may include a two-wire transmission interface composed of the local serial clock line LSCL and the local data line LSDA.

An improved inter integrated circuit (I3C) bus transmission protocol may be used on the host transmission interface 12 and the local transmission interface 14.

The control circuit 10 determines the transmission direction of the data according to form of the host data signal of the host data line HSDA and the local data signal of the local data line LSDA. The control circuit 10 determines the transmission direction of the data within the preset time elapsed after the current time reaches the time point of one of the plurality of falling edges of the clock signal of the host serial clock line HSCL. The control circuit 10, according to the host data signal of the host data line HSDA and the local data signal of the local data line LSDA, looks up the first table to obtain information for determining the transmission direction of the data, such as the first transmission direction or the second transmission direction.

For example, when the control circuit 10 determines that the transmission direction of the data is the first transmission direction, the control circuit 10 controls the switching circuit 16 such that the data is transmitted from the host data line HSDA through the switching circuit 16 to the local data line LSDA in the first transmission direction. When the control circuit 10 determines that the transmission direction of the data is the second transmission direction, the control circuit 10 controls the switching circuit 16 such that the data is transmitted from the local data line LSDA through the switching circuit 16 to the host data line HSDA in the second transmission direction.

Third Embodiment

Figure 8:
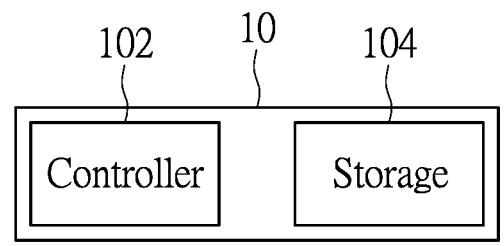
FIG. 8 is a schematic diagram of a control circuit according to a third embodiment of the present disclosure.

Reference is made to FIG. 8, which is a schematic diagram of a control circuit according to a third embodiment of the present disclosure.

In third embodiment, the control circuit 10 may include a controller 102 and a storage 104. The controller 102 is electrically connected to the storage 104. The controller 102 may be connected to the storage 104 through a bus system. The storage 104 is configured to store programs or commands. The controller 102 performs the programs or the commands that are stored in the storage 104 to realizing the above-mentioned hub transmission direction control method of the hub 1.

For example, the controller 102 may be a common processor such as a central processing unit (CPU) or a microprocessor or other, or may be a programmable logic device such as DSP, ASIC or FPGA. The storage 104 may include a read only memory (ROM), a random access memory (RAM) or other memories.

Fourth Embodiment

Figure 9:
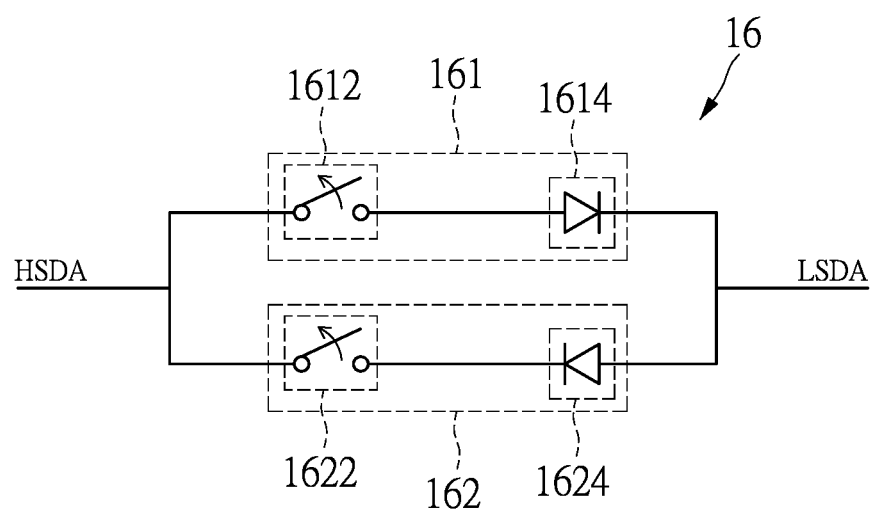
FIG. 9 is a schematic diagram of a switching circuit according to a fourth embodiment of the present disclosure.

Reference is made to FIG. 9, which is a schematic diagram of a switching circuit according to a fourth embodiment of the present disclosure.

The switching circuit 16 may include a first transmission circuit 161 and a second transmission circuit 162. Two terminals of the first transmission circuit 161 are respectively connected to the host data line HSDA of the host transmission interface 12 and the local data line LSDA of the local transmission interface 14. Two terminals of the second transmission circuit 162 are respectively connected to the host data line HSDA of the host transmission interface 12 and the local data line LSDA of the local transmission interface 14. The local transmission interface 14 is connected in parallel with the second transmission circuit 162.

The control circuit 10 controls the switching circuit 16 to switch the transmission direction of the hub 1. For example, when the transmission direction of the hub 1 is the first transmission direction, the control circuit 10 controls the first transmission circuit 161 to allow the data to be transmitted from host data line HSDA through the first transmission circuit 161 to the local data line LSDA. At the same time, the control circuit 10 controls the second transmission circuit 162 to prohibit the data from being transmitted from the local data line LSDA through the second transmission circuit 162 to the host data line HSDA.

For example, when the transmission direction of the hub 1 is the second transmission direction, the control circuit 10 controls the second transmission circuit 162 to allow the data to be transmitted from the local data line LSDA through the second transmission circuit 162 to the host data line HSDA. At the same time, the control circuit 10 controls the first transmission circuit 161 to prohibit the data from being transmitted from the host data line HSDA through the first transmission circuit 161 to the local data line LSDA.

The first transmission circuit 161 includes a first switch 1612 and a first unidirectional conduction component 1614. The first switch 1612 is connected in series with the first unidirectional conduction component 1614. When the first switch 1612 is turned on, the data may be transmitted from the host data line HSDA sequentially through the first switch 1612 and the first unidirectional conduction component 1614 to the local data line LSDA. Conversely, when the first switch 1612 is turned off, the data cannot be transmitted from the host data line HSDA sequentially through the first switch 1612 and the first unidirectional conduction component 1614 to the local data line LSDA.

The second transmission circuit 162 includes a second switch 1622 and a second unidirectional conduction component 1624. The second switch 1622 is connected in series with the second unidirectional conduction component 1624. When the second switch 1622 is turned on, the data may be transmitted from the local data line LSDA sequentially through the second unidirectional conduction component 1624 and the second switch 1622 to the host data line HSDA. Conversely, when the second switch 1622 is turned off, the data cannot be transmitted from the local data line LSDA sequentially through the second unidirectional conduction component 1624 and the second switch 1622 to the host data line HSDA. The second switch 1622 is turned on or off by the control circuit 10.

The control circuit 10 may turn on the first switch 1612 or the second switch 1622. The control circuit 10 may turn off the first switch 1612 and the second switch 1622 at the same time. However, the control circuit 10 cannot turn on the first switch 1612 and the second switch 1622 at the same time.

For example, the first unidirectional conduction component 1614 and the second unidirectional conduction component 1624 are diodes or transistors (such as normally-closed transistors that function as diodes), but the present disclosure is not limited thereto.

It should be understood by those skilled in the art that, the various illustrative logical blocks, modules, algorithms and processes described herein may be executed by a hardware, a software, a firmware, or any combination thereof. For example, the functions of the logical blocks, the modules, the algorithms and the processes may be performed through one or more instructions or programs stored or transmitted on a computer-readable medium executed by a processing unit of hardware. The computer-readable medium may include a computer-readable storage media. The computer-readable storage media may include a tangible non-transitory computer-readable storage media. The tangible non-transitory computer-readable storage media may include one ore more commands or programs. The commands or programs are executed on the commands or programs for performing the above-mentioned hub transmission direction control method of the present disclosure.

For example, the computer-readable storage media may include the random access memory (RAM), the read only memory (ROM), an electrically-erasable programmable read-only memory (EEPROM), an optical disk storage device such as a compact disc read-only memory (CD-ROM), a flash memory, a magnetic storage device such as a magnetic disk storage device, or any other computer access media that functions to store commands or codes in form of data.

In conclusion, the present disclosure provides the hub transmission direction control method, the hub and the control circuit. In the hub transmission direction control method of the present disclosure, the delay detection operation is performed such that the transmission direction is determined within the preset time elapsed after the current time reaches the time point of the falling edge of the clock signal. Under this condition, the transmission direction is prevented from being affected due to unsynchronized timing. Therefore, the transmission direction is accurately determined without increasing a sampling frequency of an internal operating clock signal and disposing additionally an interrupt pin.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A hub transmission direction control method, comprising processes of:
    detecting a clock signal of a host serial clock line;
    starting timing when the clock signal meets a trigger condition;
    when a timed time reaches a preset time, detecting a host data signal of a host data line communicated with a host device and detecting a local data signal of a local data line communicated with a local device; and
    setting, according to a detection result of the host data signal and the local data signal, a first transmission direction in which data is transmitted from the host data line to the local data line, or a second transmission direction in which data is transmitted from the local data line to the host data line, as a transmission direction between the host data line and the local data line.

2. The hub transmission direction control method according to claim 1, further comprising a process of:
    before the timed time reaches the preset time, prohibiting the data from being transmitted between the host data line and the local data line, and setting communication between the hub and the host device and communication between the hub and the local device to be supported by an improved inter-integrated circuit (I3C) bus transmission protocol.

3. The hub transmission direction control method according to claim 2, further comprising a process of:
    setting a condition that a current time reaches a time point of a falling edge of the clock signal and a time length of the preset time is smaller than a time length during which the clock signal is at a low level, as the trigger condition.

4. The hub transmission direction control method according to claim 3, further comprising a process of:
    setting a time difference between a time point at which the timed time reaches the preset time and a time point of a rising edge of the clock signal to be larger than a data setup time, wherein the time point of the rising edge of the clock signal is later than the time point at which the timed time reaches the preset time.

5. The hub transmission direction control method according to claim 4, further comprising processes of:
    when the timed time reaches the preset time and the host data signal and the local data signal are at a low logic level, setting the first transmission direction as the transmission direction between the host data line and the local data line;
    when the timed time reaches the preset time and the host data signal and the local data signal are at a high logic level, setting the first transmission direction as the transmission direction between the host data line and the local data line;
    when the timed time reaches the preset time, the host data signal is at the low logic level and the local data signal is at the high logic level, setting the first transmission direction as the transmission direction between the host data line and the local data line; and
    when the timed time reaches the preset time, the host data signal is at the high logic level, and the local data signal is at the low logic level, setting the second transmission direction as the transmission direction between the host data line and the local data line.

6. A hub, comprising:
    a host transmission interface having a host series clock line and a host data line;
    a local transmission interface having a local series clock line and a local data line;
    a control circuit; and
    a switching circuit connected respectively to the host transmission interface and the local transmission interface;
    wherein the control circuit detects a clock signal of the host serial clock line;
    wherein, when the clock signal meets a trigger condition, the control circuit starts timing;
    wherein, when a timed time reaches a preset time, the control circuit detects a host data signal of the host data line communicated with a host device and detects a local data signal of the local data line communicated with a local device;
    wherein the control circuit, according to a detection result of the host data signal and the local data signal, sets a first transmission direction in which data is transmitted from the host data line to the local data line, or a second transmission direction in which data is transmitted from the local data line to the host data line, as a transmission direction between the host data line and the local data line.

7. The hub according to claim 6, wherein, before the timed time reaches the preset time, the control circuit controls the switching circuit to prohibit the data from being transmitted between the host data line and the local data line, and communication between the hub and the host device through the host transmission interface and communication between the hub and the local device through the local transmission interface are supported by an I3C bus transmission protocol.

8. The hub according to claim 7, wherein the trigger condition includes a condition that a current time reaches a time point of a falling edge of the clock signal and a time length of the preset time is smaller than a time length during which the clock signal is at a low level.

9. The hub according to claim 8, wherein a time difference between a time point at which the timed time reaches the preset time and a time point of a rising edge of the clock signal is larger than a data setup time, and the time point of the rising edge of the clock signal is later than the time point at which the timed time reaches the preset time.

10. The hub according to claim 9, wherein, when the timed time reaches the preset time and the host data signal and the local data signal are at a low logic level, the control circuit controls the switching circuit such that the transmission direction is the first transmission direction;

wherein, when the timed time reaches the preset time and the host data signal and the local data signal are at a high logic level, the control circuit controls the switching circuit such that the transmission direction is the first transmission direction;

wherein, when the timed time reaches the preset time, the host data signal is at the low logic level, and the local data signal is at the high logic level, the control circuit controls the switching circuit such that the transmission direction is the first transmission direction;

wherein, when the timed time reaches the preset time, the host data signal is at the high logic level, and the local data signal is at the low logic level, the control circuit controls the switching circuit such that the transmission direction is the second transmission direction.

11. The hub according to claim 6, wherein the switching circuit includes:

a first transmission circuit including a first unidirectional conduction component and a first switch, wherein, when the first switch is turned on, data is transmitted from the host data line through the first unidirectional conduction component to the local data line;

a second transmission circuit including a second unidirectional conduction component and a second switch, wherein, when the second switch is turned on, data is transmitted from the local data line through the second unidirectional conduction component to the host data line;

wherein, when the transmission direction is the first transmission direction, the control circuit turns on the first switch and turns off the second switch;

wherein, when the transmission direction is the second transmission direction, the control circuit turns off the first switch and turns on the second switch;

wherein, when the control circuit prohibits the data from being transmitted between the host data line and the local data line, the control circuit turns off the first switch and turns off the second switch.

12. A control circuit, comprising:

a controller; and a storage configured to store one or more programs;

wherein the one or more programs are executed on the controller for performing the hub transmission direction control method as claimed in claim 1.

* * * * *